Dec. 22, 1942.     D. W. DOWER ET AL     2,305,954
LOCKING MEANS FOR ELECTRIC MOTOR MECHANISM
Filed July 5, 1940
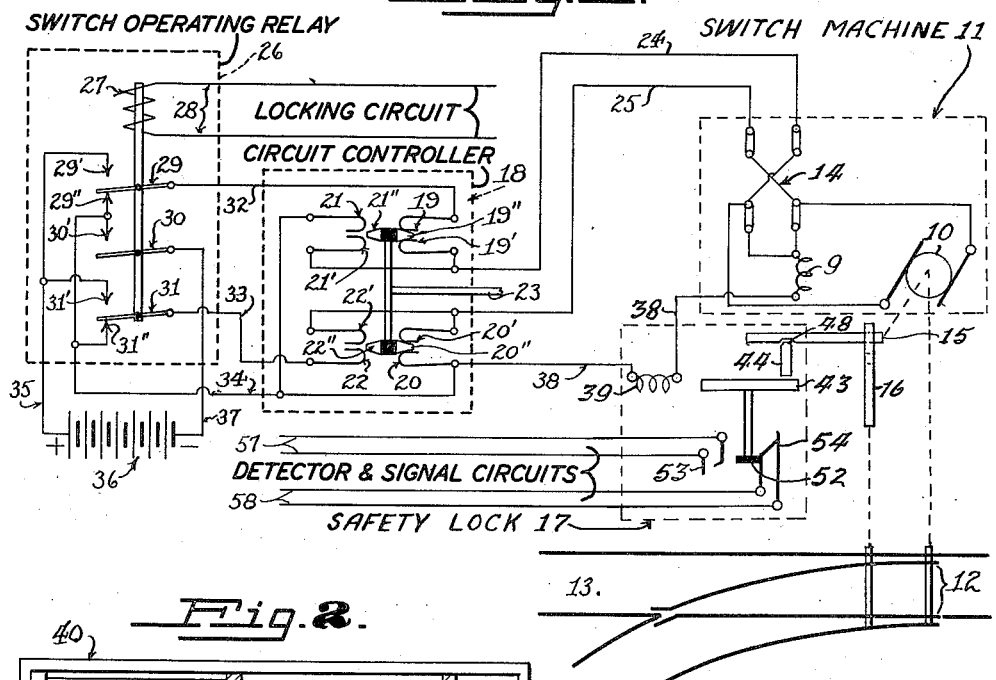
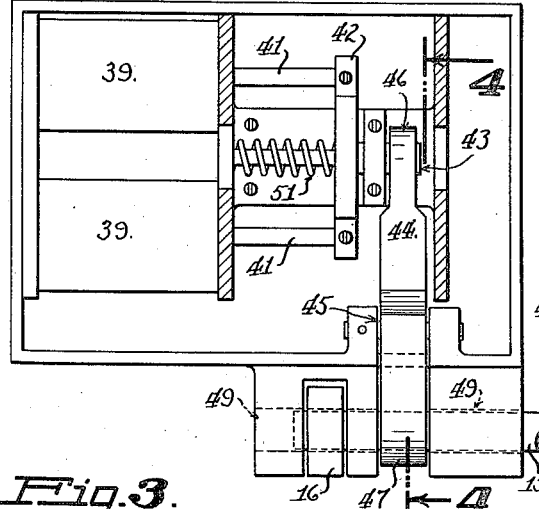
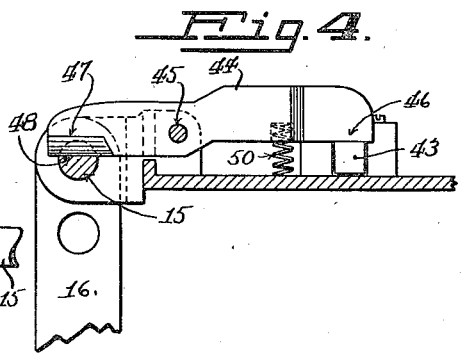
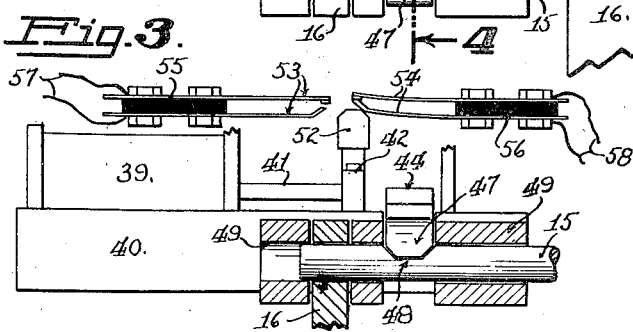
INVENTOR
David W. Dower
Walter Anderson
BY Booth & Booth
ATTORNEYS Patented Dec. 22, 1942

2,305,954

UNITED STATES PATENT OFFICE 2,305,954

LOCKING MEANS FOR ELECTRIC MOTOR MECHANISM

David W. Dower, Burlingame, and Walter Anderson, San Jose, Calif.

Application July 5, 1940, Serial No. 344,010

5 Claims. (Cl. 246—219)

The present invention relates to electrical and mechanical safety locking means for electric motor driven mechanism.

The embodiment of the invention herein illustrated and described is designed for use in connection with electrically operated railway track switches, although the essential parts may be adapted, without material change, to use with any electric motor mechanism in which locking is necessary.

The principal objects of the invention are to provide locking means which is positive in operation, which cannot be operated accidentally either by stray electric energy or by mechanical vibration, which furnishes a check on its own integrity; and to provide electrical apparatus and circuits in connection with the locking means, by which energizing of the motor circuit is permitted only when conditions are favorable therefor, and to shunt said circuit under unfavorable conditions so that it cannot receive energy from accidental sources. Other objects and advantages of the invention will become apparent from the following description, which should be read with the understanding that changes, within the scope of the claims hereto appended, may be made in the apparatus herein illustrated and described, without departing from the spirit of the invention as defined in said claims.

When embodied in a railway interlocking switch apparatus of usual type, as herein described, our invention permits considerable simplification of both mechanical and electrical structure. It eliminates the complicated and delicate locking mechanism associated with each controller lever, and several polarized relays commonly included in the circuit. It provides more reliable detector and signal operation, more positive and safer locking means for the switch points, and of still greater importance, it de-energizes the entire control circuit when not operating, and shunts all the control wires to the common return so that no accidental or stray energy can affect the circuit and cause unauthorized operation.

The locking means is operated and controlled directly by the current in the switch motor circuit, and the detector and signal circuits are controlled by the operation of the locking means. The detector and signal, or indication circuits are not affected by changes in the electrical conditions of the motor circuit unless such changes are great enough to prevent operation of the motor. By this novel arrangement, many of the usual causes of indication failure and false indication are eliminated, viz: dirty motor commutator, excessive resistance at the contacts of the controller, pole changer, and indication selector, friction and damaged parts in the controller lever and its guide. The cost of inspection, testing and maintenance is thereby reduced, and safety of operation is increased.

Throughout the following description, parts which are well known in the art and which form no part of the invention have been either omitted entirely or described briefly and illustrated conventionally. The accompanying drawing shows the essential features of the invention as embodied in a railway switch motor circuit adapted for inclusion in an interlocking system.

Fig. 1 is a diagram of the electrical and mechanical connections.

Fig. 2 is a plan, partly in section, of the safety lock with its detector contacts and cover removed.

Fig. 3 is a front elevation of the safety lock with its cover removed.

Fig. 4 is a section on the line 4—4 of Fig. 2.

In the drawing, and referring for the moment to Fig. 1, the reference numeral 11 designates a motor mechanism or switch machine for operating the points 12 of a switch in a railway track 13. The construction of said motor mechanism may be of any well known type, and is not shown in detail herein. It is assumed to be powered by a reversible electric motor having field windings 9 and armature 10 whose direction of movement is controlled by a pole changer indicated at 14. The track switch points 12 are locked in either of their two positions by a suitable mechanical locking device herein indicated, for simplicity, as a bolt 15 engaging either of two holes in a bar 16 which is connected to and moves with the switch points 12. The bolt 15 is operated by the motor mechanism 11 in the usual manner, i. e. it is disengaged from the bar 16 at the beginning of the switch throwing movement and reengaged with it at the end of said movement. The bolt 15 is itself locked by a safety lock device indicated at 17 and described in detail hereinafter.

The circuit controller, by which the motor mechanism or switch machine 11 is controlled, and which may be operated manually or otherwise, is indicated at 18. It comprises four pair of stationary contacts 19, 19', 20, 20', 21, 21', 22, 22'; and four movable contacts 19'', 20'', 21'', 22'', which move into and out of bridging relation with the corresponding pairs of stationary contacts. The movable contacts are simultaneously operated by mechanical means indicated at 23, but are not electrically connected together. When in one position, as shown, the contacts 19 and 19' are connected by the movable contacts 19'', and the contacts 20, and 20' are connected by the movable contact 20''. In the other position, not shown, the contacts 21 and 21' are connected by the movable contact 21'', and the contacts 22 and 22' are connected by the movable contact 22''. Contacts 19' and 21' are connected by a wire 24 with one side of the pole changer 14, and contacts 20' and 22' are connected by a wire 25 with the other side of said pole changer.

The numeral 26 indicates a switch operating relay whose functions are to permit electric energy to be supplied to the circuit controller 18 and thence to the motor mechanism 11 only when conditions are favorable in other circuits such as approach or stick locking circuits, detector locking circuits, route locking circuits, etc., and to shunt the controller and motor circuit to prevent its operation when unfavorable conditions exist in said other circuits. The coil or solenoid 27 of the relay 26 is connected in any suitable way with one or more of said locking circuits, which may be generally indicated by the wires 28, in such a manner that the coil 27 is energized and the relay picks up when conditions favorable to switch operation exist in said locking circuit 28, but when conditions in said circuit 28 are unfavorable to switch operation, the relay is deenergized and drops away. The relay 26 may have a plurality of contacts arranged in series and parallel connection to carry the heavy current necessary to operate the motor of the switch machine 11, and to prevent arcing at the points, but for the sake of simplicity, said relay 26 is shown in Fig. 1 as having only three movable contacts 29, 30, 31, operated in unison by the coil 27, all having front contacts 29', 30', 31' respectively. Movable contacts 29 and 31 also have back contacts 29'' and 31''. Movable contacts 29 and 31 are connected by wires 32 and 33 respectively with contacts 19 and 22 of the controller 18. Relay back contacts 29'' and 31'', and front contact 30' are all connected by a common wire 34 with controller contacts 20 and 21. Relay front contacts 29' and 31' are connected by a wire 35 to the positive side of battery 36, and contact 30 is connected by wire 37 with the negative side of said battery. The common wire 34 is connected by a wire 38 with the field winding of the motor of the switch machine 11, and the coils 39 of the safety lock 17 (to be described later) are in series in said wire 38.

When the relay 26 is energized, and the movable member 23 of the controller 18 is in the position shown, the motor circuit is as follows: positive battery, wire 35, relay contacts 29' and 29, wire 32, controller contacts 19 and 19', wire 24, pole changer 14, armature 10, field winding 9, safety lock coils 39, common wires 38 and 34, relay contacts 30' and 30, wire 37, to negative battery. The motor mechanism 11 then operates to throw the switch 12 to normal position. When the controller is moved to its other position, the motor mechanism 11 operates in the other direction to reverse the switch 12, the circuit then being as follows: positive battery, wire 35, relay contacts 31' and 31, wire 33, controller contacts 22 and 22', wire 25, pole changer 14, armature 10, field winding 9, safety lock coils 39, wires 38 and 34, relay contacts 30' and 30, wire 37, to negative battery.

When the relay 26 is deenergized, as shown, battery contacts 29', 31', and 30 are open, and wires 32, 33 and 34 leading from the relay to the controller are all shunted together by relay contacts 29 and 29'', and 31 and 31''. Furthermore, when the relay is deenergized and the controller is in either position, both wires 24 and 25 leading from it to the motor of the switch machine 11 are shunted to the common return. In the controller position shown, wire 24 is connected through contacts 19' and 19 with wire 32 and thence through the relay contacts with wires 34 and 33; and wire 25 is connected through controller contacts 20' and 20 with wire 34 and thence through the relay contacts with wires 32 and 33. In the opposite position of the controller, wire 24 is connected by contacts 21' and 21 with wire 34; and wire 25 is connected by contacts 22' and 22 with wire 33. Thus all wires leading from the relay through the controller to the motor are connected together and shunted to the common return wires 34 and 38, so that no possible accidental source of energy can cause operation of the motor. Moreover, when the circuit is energized, the dead wire 24 or 25, as the case may be, is shunted to the common return wire 34, so that an accidental cross connection between the wires 24 and 25 or between either of them and the common wire 38, can do nothing more serious than to stop the motor.

The safety lock 17, as shown in detail in Figs. 2, 3 and 4, comprises a base 40, a pair of solenoids 39, sliding armatures 41 carrying a cross head 42, a keeper bar 43 extending forwardly from said cross head, and a latch lever 44 pivoted at 45. The inner end 46 of said lever rests closely above the bar 43 when the latter is extended, and its outer end 47 is cam shaped and rests in a notch 48 with inclined sides formed in the sliding bolt 15, which operates in guides 49, and locks the switch bar 16. A spring 50 retains the lever 44 in the position shown, and a spring 51 extends the bar 43 and cross head 42 when the solenoids are deenergized. In locked position, as shown, the coils 39 are deenergized, the bar 43 is extended and lies beneath the inner end 46 of the lever 44, thereby holding the outer end 47 of said lever in the notch 48 of the locking bolt 15, and said bolt, passing through the switch bar 16, locks the switch against movement. When the coils 39 are energized, the bar 43 is retracted from beneath the inner end of the lever 44, so that the outer end of said lever can be raised by the sliding of the bolt 15 and the cam action of the notch 48. When the outer end of said lever is raised, i. e. when the bolt 15 is withdrawn from its locking engagement with the switch bar 16, the inner end 46 of said lever is depressed into the path of the bar 43, so that the latter, with the cross head 42, cannot move to extended position.

The cross head 42 carries an insulated cam block 52, which engages and closes front contacts 53 when the coils 39 are energized and the cross head retracted, and which engages and closes back contacts 54 when the coils are deenergized and said cross head is extended. The contacts 53 and 54 are mounted on insulating blocks 55 and 56 secured to the frame of the device, and are included in suitable detector or signal circuits indicated by wires 57 and 58. The contacts 53 and 54, and the indicating circuits 57 and 58 not only check the integrity of the safety lock itself, but also prevent the clearing of a signal over a switch that is not properly locked.

It will readily be seen that the safety lock is a positive device which can release the switch bar only when the motor circuit is energized. With said switch bar and the bolt 15, it constitutes a positive mechanical lock electrically controlled, i. e. the switch bar is locked by the bolt 15, which is operated by the motor mechanism in the usual manner, the bolt 15 is locked by the lever 44, and said lever is locked by the bar 43 operated by the solenoids 39, which are energized directly by current in the motor circuit. With this arrangement of parts, and the described electrical connections, neither accidental currents in the circuit nor mechanical vibration can release the safety lock, or cause the detector circuits to give false indications. This removes dependence for safety from the switch restoring feature of the motor mechanism. Such restoring feature, which is well known and has, therefore, been omitted from the drawing, has no function in our arrangement other than to restore the switch when the controller is reversed before the switch mechanism has completed its movement.

We claim:

1. In a railway switch apparatus, a track switch, an electric motor operated switch machine, a controller therefor, a safety lock device associated with said machine comprising a movable member for locking said switch and magnetic means for controlling said movable member, said magnetic means including a coil and an armature, contacts operated by said armature, an indicating circuit controlled by said contacts, a motor circuit including said controller, said switch machine, the coil of said safety lock device, and a source of energy, a relay having a coil and contacts operated thereby, said relay contacts being included in said motor circuit to control it independently of said controller, and a locking circuit including the coil of said relay.

2. In a railway switch apparatus, a track switch, a reversible electric motor operated switch machine, a safety lock device associated with said machine comprising a movable member for locking said switch and magnetic means for controlling said movable member, said magnetic means including a coil and an armature, contacts operated by said armature, an indicating circuit controlled by said contacts, a relay having a coil and a plurality of contacts operated thereby, a locking circuit including said coil and controlling the operation of said relay, a source of energy, a controller for said swich machine, said controller having contacts, two circuits including said source of energy, said relay contacts, said controller contacts, and the motor of said switch machine, said circuits having a common return wire and the coil of said safety lock device being connected in series in said common return wire, one of said circuits operating said motor in a forward direction and the other circuit operating it in the reverse direction, and said relay contacts being arranged to disconnect the source of energy from said circuits when the relay coil is deenergized and simultaneously to shunt both said circuits to their common return.

3. In an apparatus for the described purpose, a reversible electric motor mechanism, a controller therefor, said controller having contacts, a relay having contacts and a coil for operating them, a locking circuit including said coil for controlling said relay, a source of energy connected with said relay contacts, two circuits including said source of energy, said relay contacts, said controller contacts, and said motor, one circuit operating said motor in a forward direction and the other circuit operating said motor in the reverse direction, said circuits having a common return, said controller contacts closing either one of said circuits and simultaneously opening and shunting the other circuit, and said relay contacts disconnecting said source of energy from both circuits simultaneously and shunting them to said common return.

4. In an apparatus for the described purpose, a reversible electric motor, a controller therefor, a relay having a coil, a locking circuit including said coil for controlling said relay, a source of electric energy, two conductors leading from said controller to said motor, one of said conductors being a forward lead carrying current for operating said motor in a forward direction and the outer conductor being a reverse lead carrying current for operating said motor in the reverse direction, a third common lead between said controller and said motor, three conductors leading from said relay to said controller one being a forward lead, one being a reverse lead, and one being a common lead connected with said common motor lead, contacts in said controller movable in one direction to connect said forward motor lead with said forward relay lead and said reverse motor lead with said common lead, and movable in the other direction to connect said reverse motor lead with said reverse relay lead and said forward motor lead with said common lead, contacts on said relay movable in one direction to connect said forward and reverse controller leads with one side of said source of energy and said common lead with the other side of said source, said relay contacts being movable in the other direction to connect said forward and reverse controller leads with said common lead.

5. In a railway switch apparatus, a track switch, an electric motor operated switch machine, a movable primary locking member operated by the movements of said switch machine to lock and unlock said switch, movable secondary locking means engaging said primary locking member to prevent movement thereof, magnetic means including a coil and an armature, said armature being associated with said secondary locking means to cause it to disengage said primary locking member when said coil is energized, a controller for said switch machine, and a motor circuit including said controller, the motor of said switch machine, said coil, and a source of energy, said coil being energized with the motor of said switch machine.

DAVID W. DOWER.
WALTER ANDERSON.